(12) United States Patent
Inugai

(10) Patent No.: US 7,673,830 B2
(45) Date of Patent: Mar. 9, 2010

(54) TAPE CARTRIDGE

(75) Inventor: Yasuo Inugai, Osaka (JP)

(73) Assignee: Hitachi Maxell, Ltd., Ibaraki-shi, Osaka (JP)

( * ) Notice: Subject to any disclaimer, the term of this patent is extended or adjusted under 35 U.S.C. 154(b) by 42 days.

(21) Appl. No.: 12/027,919

(22) Filed: Feb. 7, 2008

(65) Prior Publication Data

US 2008/0191082 A1 Aug. 14, 2008

(30) Foreign Application Priority Data

Feb. 8, 2007 (JP) ............................. 2007-029669

(51) Int. Cl.
*G11B 23/04* (2006.01)

(52) U.S. Cl. ..................... 242/340; 242/611

(58) Field of Classification Search ................ 242/338, 242/338.1, 340, 347, 348.2, 611, 611.1, 611.2; 360/83, 93, 96.1
See application file for complete search history.

(56) References Cited

U.S. PATENT DOCUMENTS

| 3,857,531 | A | * | 12/1974 | Jantzen | 242/342 |
|---|---|---|---|---|---|
| 4,309,002 | A | * | 1/1982 | Saitou et al. | 242/340 |
| 6,728,066 | B2 | * | 4/2004 | Morita et al. | 360/132 |
| 6,869,037 | B2 | * | 3/2005 | Hiraguchi | 242/348 |
| 7,104,486 | B2 | * | 9/2006 | Hiraguchi | 242/338.1 |
| 7,350,731 | B2 | * | 4/2008 | Hiraguchi | 242/338.1 |
| 7,472,857 | B2 | * | 1/2009 | Inugai et al. | 242/340 |
| 2002/0134875 | A1 | * | 9/2002 | Zwettler et al. | 242/348.2 |
| 2003/0132332 | A1 | * | 7/2003 | Amano et al. | 242/348 |
| 2005/0105210 | A1 | | 5/2005 | Okawa et al. | |
| 2008/0029632 | A1 | * | 2/2008 | Inugai et al. | 242/340 |

FOREIGN PATENT DOCUMENTS

| JP | 2003-223774 A | 8/2003 |
|---|---|---|
| JP | 2004-273014 A | 9/2004 |

* cited by examiner

*Primary Examiner*—Evan H Langdon
(74) *Attorney, Agent, or Firm*—Birch, Stewart, Kolasch & Birch, LLP

(57) ABSTRACT

A tape cartridge is provided having an improved fit between a reel hole and a drive shaft of a drive. A reel hole that fits with a drive shaft provided in a drive for rotationally driving a reel is formed in the reel. The drive shaft includes a fitting shaft that fits with the reel hole and a guide shaft that enters the reel hole before the fitting shaft and has an outer dimension increasing toward the fitting shaft. A chamfered portion is formed so as to surround the outer periphery of the reel hole. The chamfered portion is constituted by an inclined face joining an inner peripheral face of the reel hole to the surface in which the reel hole is formed. When the reel hole is viewed from a side facing an opening portion of the reel hole, a portion of the reel hole that fits with the fitting shaft has a polygonal shape, and the inclined face contains a portion in which the width of the inclined face varies along an edge of the polygonal shape.

3 Claims, 10 Drawing Sheets

TAPE CARTRIDGE

BACKGROUND OF THE INVENTION

1. Field of the Invention

The present invention relates to a tape cartridge, and more particularly to a tape cartridge that has an improved fit between a reel and a driving portion of a drive.

2. Description of Related Art

A reel in a tape cartridge is rotationally driven while being connected to a drive shaft of a drive by engagement therewith. By rotationally driving the reel, a recording tape wound around the reel is taken up onto or drawn out from the reel. As a structure for driving the reel, a system in which power is transmitted by meshing gears is most commonly used.

In this driving system, as is exemplified by single-reel type tape cartridges, the reel is rotationally driven by meshing gear teeth formed on the lower face of a reel boss with a driving gear formed on the outer periphery of the upper end face of a drive shaft of a drive (see JP 2004-273014A and JP 2003-223774A).

However, in the driving system as described above in which gears are meshed with each other, there are cases where the gears do not mesh well with each other due to misalignment of the centers of rotation. Moreover, when the gear precision is not ensured, there are cases where displacement occurs in the position of fit between a gear portion of the reel and a gear portion of the drive shaft, resulting in an increase in the degree to which flange faces of the reel wobble. In this case, there is the possibility of a worst-case scenario, in which the tape and the flange faces make contact with each other and causes a malfunction.

SUMMARY OF THE INVENTION

The present invention has been conceived to solve the conventional problems as described above, and it is an object thereof to provide a tape cartridge having a good fit between the reel and the drive shaft of the drive.

In order to achieve this object, the tape cartridge of the present invention is a tape cartridge including a reel wound with a tape, in which a reel hole that fits with a drive shaft provided in a drive for rotationally driving the reel is formed in the reel, the drive shaft includes a fitting shaft that fits with the reel hole and a guide shaft that enters the reel hole before the fitting shaft and has an outer dimension increasing toward the fitting shaft, a chamfered portion is formed so as to surround the outer periphery of the reel hole, the chamfered portion is constituted by an inclined face joining an inner peripheral face of the reel hole to the surface in which the reel hole is formed, and when the reel hole is viewed from a side facing an opening portion of the reel hole, a portion of the reel hole that fits with the fitting shaft has a polygonal shape, and the inclined face contains a portion in which the width of the inclined face varies along an edge of the polygonal shape.

BRIEF DESCRIPTION OF THE DRAWINGS

FIG. 4A is a perspective view, and FIG. 4B is a plan view taken from the direction of the arrow A.

FIG. 5A is a plan view, and FIG. 5B is a perspective view.

FIG. 7A shows the state before the start of fitting between the drive shaft 7 and the reel hole 6, FIG. 7B shows the state after the drive shaft 7 has rotated in the direction of the arrow a from the state shown in FIG. 7A, and FIG. 7C shows the state in which the rotation of the drive shaft 7 is completed.

FIG. 8A is a perspective view in the case where the reel hole 6 of FIG. 6 is replaced with a reel hole 23 according to one of the comparative examples, and FIG. 8B is a perspective view showing a reel hole according to the other comparative example.

FIG. 9A shows the state when an angle θ is 22.5°, FIG. 9B shows the state when the angle θ is −22.5°, and FIG. 9C shows the state when the angle θ is 45°.

FIG. 10A shows the state before the start of fitting between the drive shaft 7 and the reel hole 6, FIG. 10B shows the state after the drive shaft 7 has rotated in the direction of the arrow d from the state shown in FIG. 10A, and FIG. 10C shows the state in which the rotation of the drive shaft 7 is completed.

DETAILED DESCRIPTION OF THE INVENTION

The tape cartridge according to the present invention includes the chamfered portion constituted by an inclined face formed in the reel hole, so that when the drive shaft of the drive is fitted into the reel hole, the drive shaft is attracted by the chamfered portion. Thus, it is possible to provide an improved fit between the reel hole and the drive shaft.

In the tape cartridge according to the present invention, it is preferable that in the portion in which the width of the inclined face varies, the width of the inclined face increases toward a corner of the polygonal shape.

Furthermore, it is preferable that when the reel hole is viewed from the side facing the opening portion of the reel hole, a position at which the width of the inclined face is minimal is displaced from a position on a line passing through the center of the polygonal shape and the midpoint of the edge of the polygonal shape. With this configuration, fitting between the reel hole and the fitting shaft can be carried out even more smoothly, irrespective of the rotation angle of the guide shaft at the start of contact between the guide shaft and the reel hole.

Figure 1:
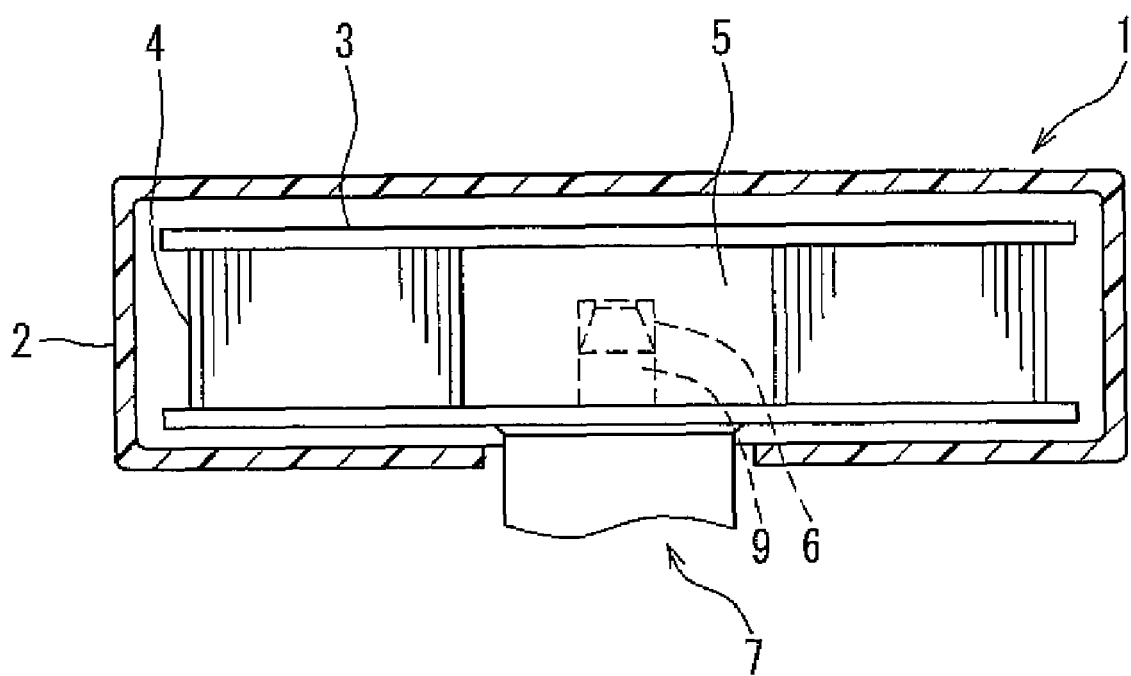
FIG. 1 is a schematic view showing a state in which a tape cartridge and a drive shaft according to an embodiment of the present invention are fitted together.

Hereinafter, an embodiment of the present invention will be described with reference to the drawings. FIG. 1 is a schematic view showing a state in which a tape cartridge and a drive shaft are fitted together. In FIG. 1, a single-reel type tape cartridge 1 is shown as an example of the tape cartridge. A reel 3 is housed in a case 2. Recording tape 4 is wound around a hub 5 provided in a central portion of the reel 3.

FIG. 1 illustrates a state in which the tape cartridge 1 is mounted on a drive and the reel 3 can be rotationally driven. Regarding the drive, only the drive shaft 7 is shown in FIG. 1, and the other constituents are omitted. A fitting shaft 9 of the drive shaft 7 of the drive is fitted in a reel hole 6 provided in the reel 3. By rotating the drive shaft 7, the fitting shaft 9 fitted in the reel hole 6 is rotated, which in turn rotates the reel 3.

By rotating the reel 3, the recording tape 4 wound around the reel 3 can be drawn out, and the drawn-out recording tape 4 can be taken up onto the reel 3. Recording of information signals on the recording tape 4 and reproduction of information signals recorded on the recording tape 4 are performed while rotationally driving the reel S.

Figure 2:
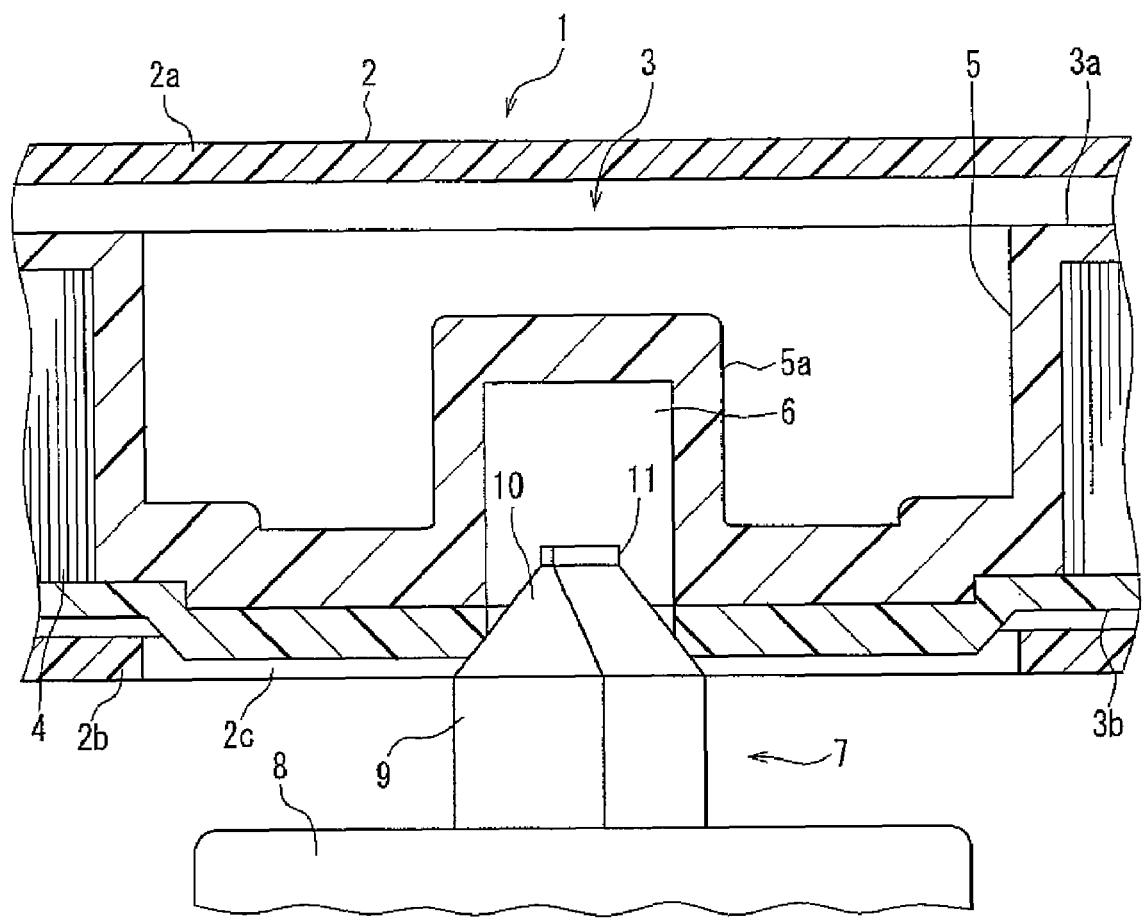
FIG. 2 is an enlarged cross-sectional view showing the vicinity of a reel hole 6 of the tape cartridge 1 shown in FIG. 1.

FIG. 2 is an enlarged cross-sectional view showing the vicinity of the reel hole 6 of the tape cartridge 1 shown in FIG. 1. FIG. 2 shows a state immediately before the fitting shaft 9 of the drive shaft 7 fits into the reel hole 6. The case 2 is formed in a rectangular box shape by bonding an upper case 2a and a lower case 2b together. A drive shaft insertion hole 2c is formed in the bottom wall of the lower case 2b.

The reel 3 is constituted by an upper flange 3a and a lower flange 3b. A hub 5 for winding up the recording tape 4 is integrated with the upper flange 3a. The lower flange 3b is fixed to the bottom face of the hub 5. The hub 5 has an opening at the top, and a connecting boss 5a is formed at the center of an inner face of the opening. The reel hole 6, into which the fitting shaft 9 fits, is formed extending from the inside of the connecting boss 5a to the lower face of the lower flange 3b. The reel 3 is continuously energized downward by a compression coil spring (not shown) disposed between the inner bottom of the hub 5 and the upper case 2a.

The drive shaft 7 includes a shaft main body 8 in the form of a cylindrical shaft, the fitting shaft 9 projecting from the center of the upper end face of the shaft main body 8, a truncated-quadrangular pyramid-shaped guide shaft 10 formed contiguously to the upper end of the fitting shaft 9, and a protrusion 11. The length of the reel hole 6 in the vertical direction is set to a dimension that can receive the fitting shaft 9, the guide shaft 10, and the protrusion 11. The fitting shaft 9 has a quadrangular shape in cross section according to the hole shape of the reel hole 6. The distance between opposite edges of this quadrangular cross-sectional shape is slightly smaller than the distance between opposite edges of the reel hole 6 so that the fitting shaft 9 can be inserted and fitted in the reel hole 6.

Figure 3:
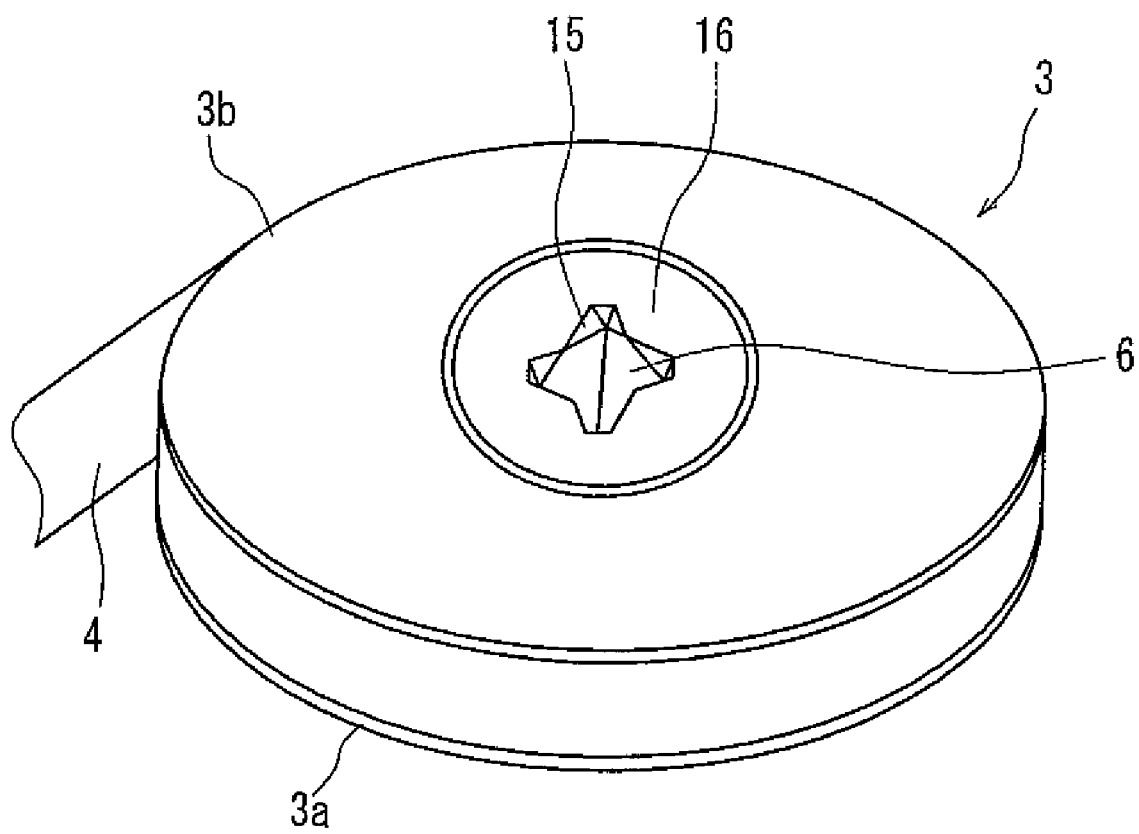
FIG. 3 is a perspective view of a reel according to the embodiment of the present invention.

FIG. 3 shows a perspective view of the reel 3. In FIG. 3, an opening portion of the reel hole 6 of the reel 3 faces upward, i.e., the lower flange 3b is positioned on the upper side. A chamfered portion 15 is formed around the reel hole 6. A detailed description of the chamfered portion 15 will be provided later.

Figure 4A:
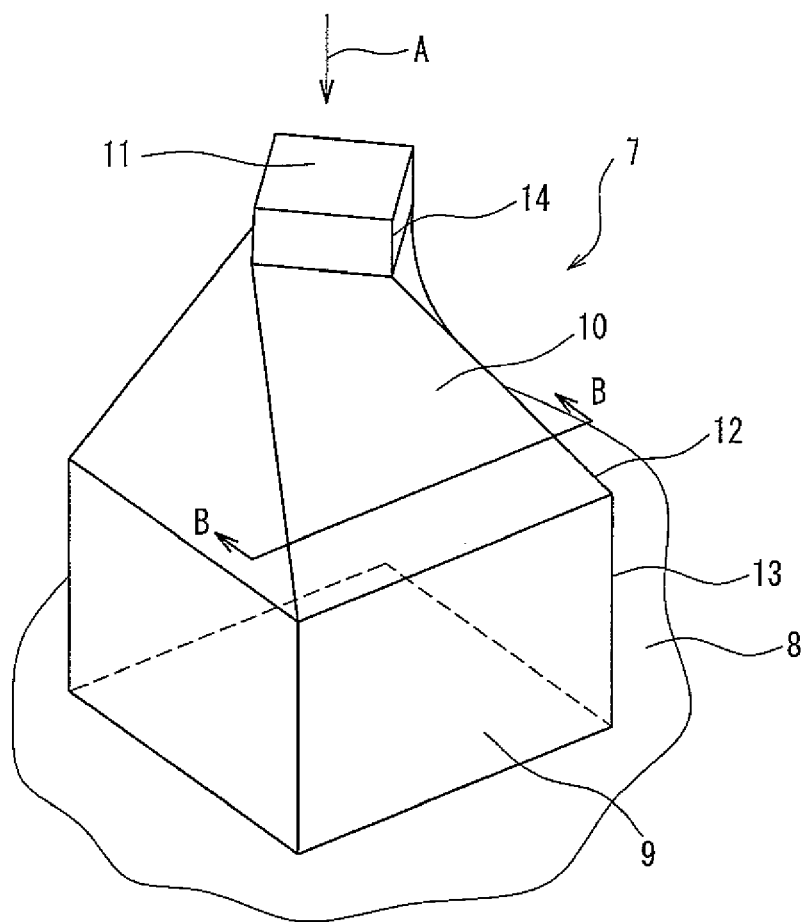
FIGS. 4A and 4B show the drive shaft according to the embodiment of the present invention, where
Figure 4B:
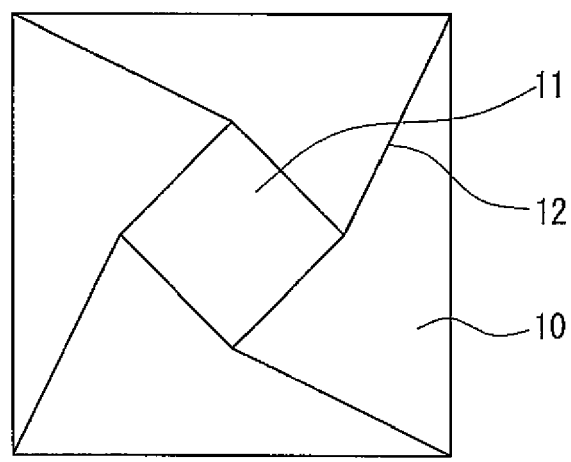

FIGS. 4A and 4B show the drive shaft 7. FIG. 4A is a perspective view, and FIG. 4B is a plan view taken from the direction of the arrow A. The fitting shaft 9, the guide shaft 10, and the protrusion 11 are formed integrally with the shaft main body 8. The fitting shaft 9 is a shaft that fits in the reel hole 6. The guide shaft 10 is a shaft that enters the reel hole 6 in advance when the fitting shaft 9 is fitted into the reel hole 6. More specifically, as described later, the drive shaft 7 moves toward the inner side of the reel hole 6 with the guide shaft 10 sliding on the chamfered portion 15 (FIG. 3) at the outer periphery of the reel hole 6 while also rotating.

The cross-sectional shape of the guide shaft 10 in the direction of the arrow B (direction orthogonal to the direction of the rotation axis of the drive shaft 7) is a quadrangle having a different size from the cross-sectional shape of the fitting shaft 9 in the direction of the arrow B. The guide shaft 10 has a shape that can make fitting of the fitting shaft 9 into the reel hole 6 more smooth. That is to say, the entire guide shaft 10 is tapered upward, and at the same time, the entire guide shaft 10 is twisted in one direction central to the rotation axis of the drive shaft 7.

More specifically, as shown in FIG. 4A, a quadrangle forming the protrusion 11 is smaller than the quadrangle forming the fitting shaft 9 and also is arranged in a state rotated around the rotation axis of the drive shaft 7. In addition, ridgelines 12 of the guide shaft 10 are the shortest lines connecting the upper ends of ridgelines 13 of the fitting shaft 9 and the lower ends of ridgelines 14 of the protrusion 11.

As a result, faces of the guide shaft 10 between adjacent ridgelines 12 are not two-dimensional planes, as in the case where the twist is not applied, but rather have a three-dimensional shape that is deformed along the direction of the twist of the guide shaft 10.

In this configuration, the area of the quadrangular cross-sectional shape of the guide shaft 10 in the direction of the arrow B decreases toward the upper side (the protrusion 11 side). Moreover, this cross-sectional shape is rotated around the rotation axis of the drive shaft 7 at gradually increasing rotation angles toward the upper side so as to approach the shape of the quadrangle forming the protrusion 11.

Figure 5A:
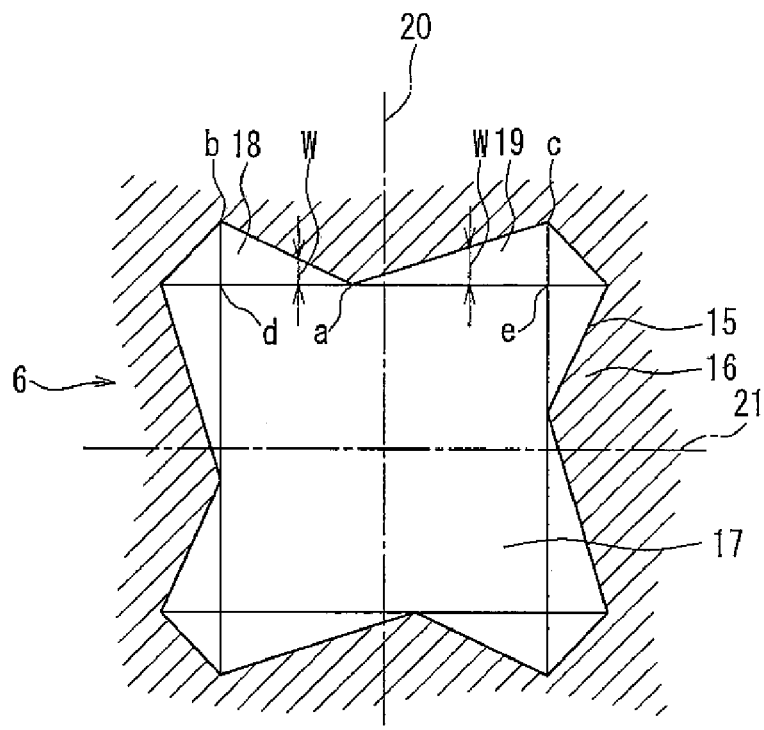
FIGS. 5A and 5B show the shape in the vicinity of the reel of the tape cartridge according to the embodiment of the present invention, where
Figure 5B:
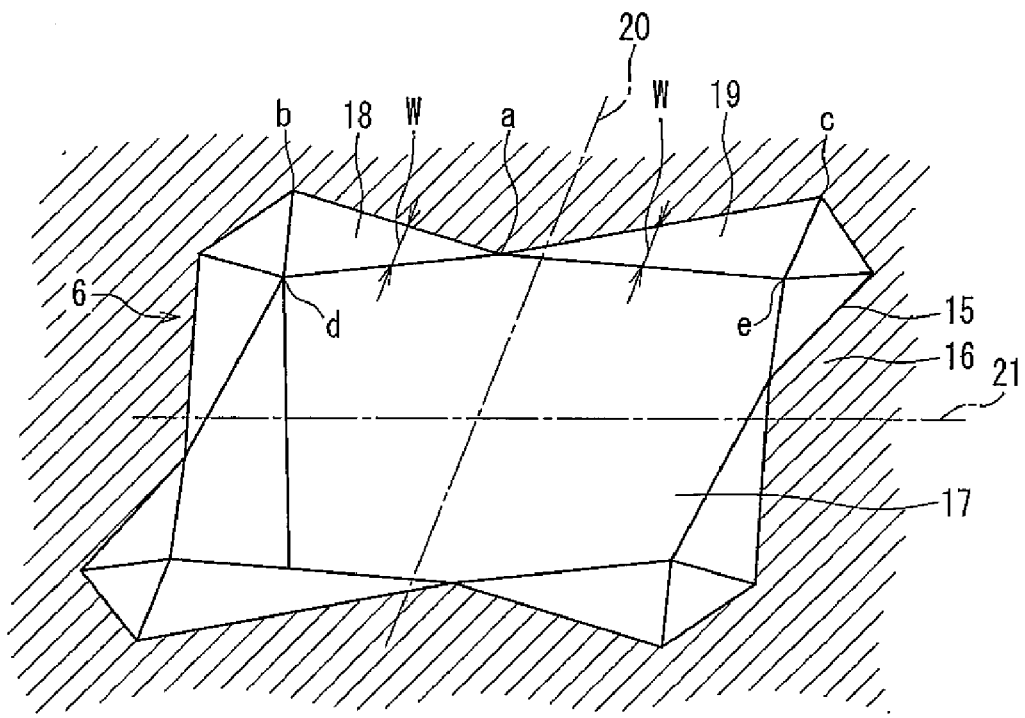

FIGS. 5A and 5B show the shape of the vicinity of the reel hole 6. FIGS. 5A and 5B show the reel hole 6 as seen from the side facing the opening portion of the reel hole 6, where FIG. 6A is a plan view, and FIG. 5B is a perspective view. Sufaces 16 indicated by oblique lines are on the same plane. In FIG. 3, this area corresponds to the surface in the vicinity of the reel hole 6 of the lower flange 3b.

The chamfered portion 15 will be described with reference to points a to e shown in FIGS. 5A and 5B. Hereinafter, the surface 16 side is referred to as the upper side, and the opposite side of the surface 16, that is, the inner side of the reel hole 6, is referred to as the lower side. The chamfered portion 15 is formed by inclined faces 18 and 19 joining inner peripheral faces of the reel hole 6 to the surface 16 in which the reel hole 6 is formed. That is to say, the chamfered portion 15 is constituted by the inclined faces 18 and 19 formed at corners where the inner peripheral faces of the reel hole 6 and the surface 16 meet.

As shown in FIG. 5A, the chamfered portion 15 is formed by four parts corresponding to edges of a quadrangular hole. These four parts have the same shape. Thus, only one of the four parts will be described. However, the description also applies to the other parts.

The points a to c are on the surface 16, and the points d and e are below the surface 16. In plan views such as FIG. 5A, the points d and e are located at positions of the vertices of a quadrangle defining the quadrangular hole 17.

In this configuration, the inclined face 18 having a triangular shape whose vertices are the points a, b, and d is formed, and the inclined face 19 having a triangular shape whose vertices are the points a, c, and e is formed. The width W of the inclined face 18 decreases toward the point a and increases toward the points b and d. Similarly, the width W of the inclined face 19 decreases toward the point a and increases toward the points c and e.

In FIGS. 5A and 5B, the quadrangular hole 17 has a vertical center line 20 and a horizontal center line 21 that is orthogonal to the vertical center line 20. In plan views such as FIG. 5A, the vertical center line 20 and the horizontal center line 21 are lines that pass through the center and the midpoints of the edges of the quadrangle defining the quadrangular hole 17. With respect to the direction of the vertical center line 20, the inclinations of the inclined faces 18 and 19 increase as these inclined faces become closer to the quadrangular hole 17.

Figure 6:
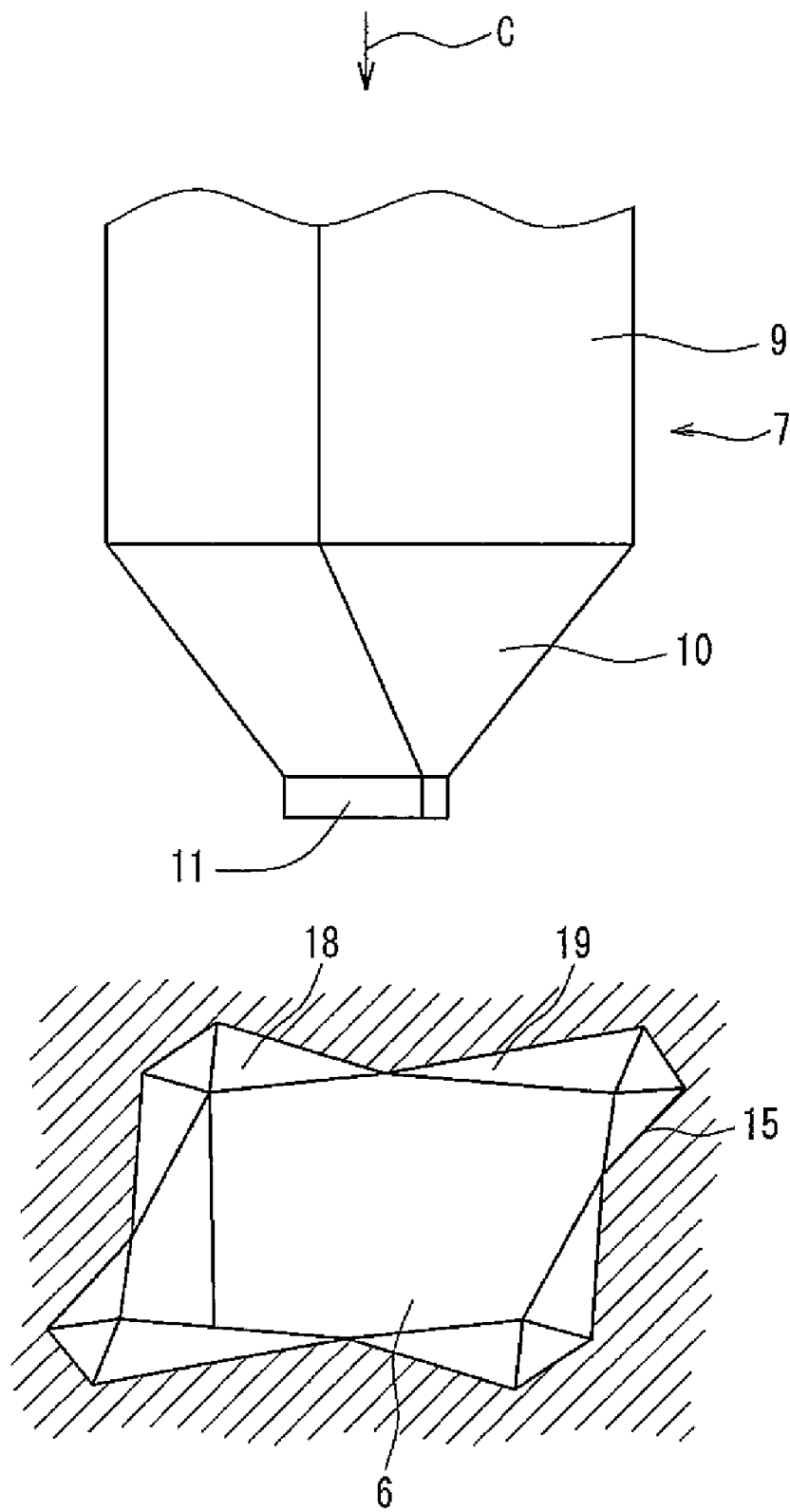
FIG. 6 is a perspective view showing a state before the start of fitting between the drive shaft and the reel hole according to the embodiment of the present invention.

FIG. 6 is a perspective view for illustrating a state before the start of fitting between the drive shaft 7 and the reel hole 6. The drive shaft 7 is on standby above the reel hole 6. When the drive shaft 7 is moved toward the reel hole 6 (the direction of the arrow C), the drive shaft 7 enters the inside of the reel hole 6 in the order of the protrusion 11 and the guide shaft 10.

The outer dimensions of the guide shaft 10 increase toward the fitting shaft 9 side. For example, a comparison between the maximum outer dimensions of external shapes of two horizontal sections of the guide shaft 10 indicates that the dimensions on the fitting shaft 9 side are larger than those on the reel hole 6 side. For this reason, the guide shaft 10 comes into contact with the chamfered portion 15 during the movement of the drive shaft 7. After the guide shaft 10 comes into contact with the chamfered portion 15, the guide shaft 10 enters the inside of the reel hole 6 while sliding on the inclined faces 18 or 19 of the chamfered portion 15 while also rotating. This will be described more specifically using FIGS. 7A to 7C.

Figure 7A:
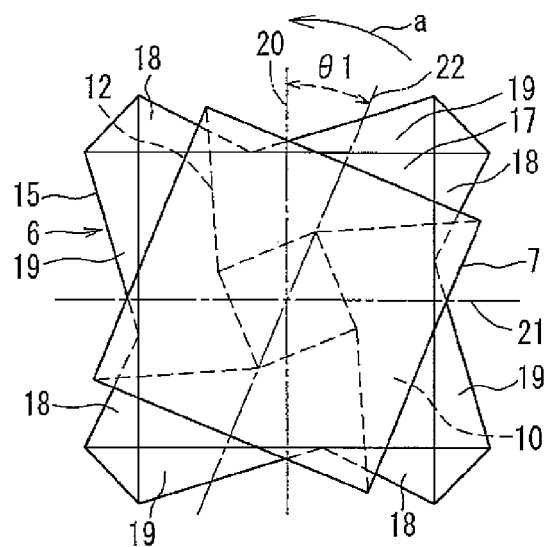
FIGS. 7A to 7C are plan views showing states from the start to the completion of fitting between the drive shaft and the reel hole according to the embodiment of the present invention, where
Figure 7B:
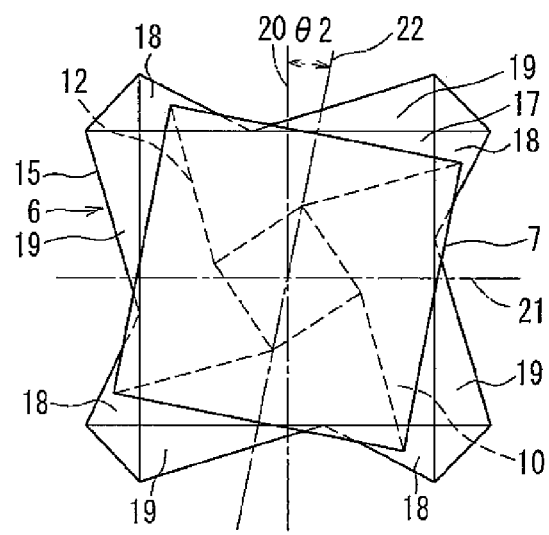
Figure 7C:
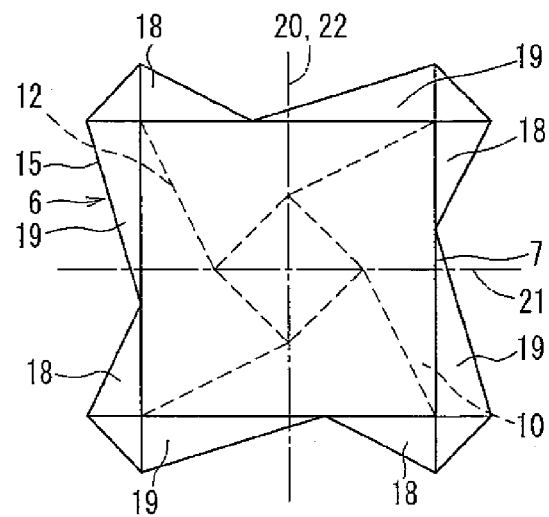

FIGS. 7A to 7C are plan views for illustrating states from before the start to the completion of fitting between the drive shaft 7 and the reel hole 6. FIGS. 7A to 7C correspond to plan views of the drive shaft 7 and the reel hole 6 shown in FIG. 6 as seen from the side facing the opening portion of the reel hole 6 (the direction of the arrow C). Moreover, the drive shaft 7 shown in FIGS. 7A to 7C corresponds to an external shape of the quadrangle defining the fitting shaft 9 (FIG. 4A). A line passing through the center and the midpoints of edges of the quadrangle, which is the external shape, is a vertical center line 22.

FIG. 7A shows the state before the start of fitting between the drive shaft 7 and the reel hole 6. This state corresponds to a state in which, in FIG. 6 described above, the guide shaft 10 starts to come into contact with the chamfered portion 15 during the movement of the drive shaft 7 in the direction of the arrow C.

In FIG. 7A, the vertical center line 20 of the reel hole 6 and the vertical center line 22 of the drive shaft 7 form an angle θ1. Since the drive shaft 7 is rotatable, the angle θ1 usually varies each time fitting is performed, and thus the angle θ1 is an arbitrary angle. In an example shown in FIG. 7A, the angle θ1 is about 20°.

As described using FIGS. 5A and 5B, the two types of inclined faces 18 and 19 of the chamfered portion 15 correspond to each of the edges of the quadrangular hole 17. The four ridgelines 12 of the guide shaft 10 are on the respective inclined faces 18.

Here, as described using FIGS. 5A and 5B, the widths W of the inclined faces 18 and 19 increase toward the corner side of the quadrangular hole 17. Furthermore, with respect to the direction of the vertical center line 20 of the quadrangular hole 17, the inclinations of the inclined faces 18 and 19 increase as these inclined faces become closer to the quadrangular hole 17.

With the chamfered portion 15 configured in this manner, when the guide shaft 10 is moved downward, the ridgelines 12 of the guide shaft 10 are attracted to the wider side, namely, the deeper side of the inclined faces 18. Accordingly, the drive shaft 7 rotates. That is to say, after the guide shaft 10 comes into contact with the chamfered portion 15, the entire drive shaft 7 moves downward with the ridgelines 12 of the guide shaft 10 moving along the inclined faces 18 while the guide shaft 10 also rotates.

FIG. 7B shows the state after the drive shaft 7 has rotated in the direction of the arrow a from the state shown in FIG. 7A. As a result of the rotation of the drive shaft 7, the angle θ1, which was about 20° in the state shown in FIG. 7A, becomes an angle θ2 of about 10°. It can be seen from a comparison between the state shown in FIG. 7B and the state shown in FIG. 7A that the ridgelines 12 of the guide shaft 10 are attracted to the wider side, namely, the deeper side of the inclined faces 18.

FIG. 7C shows the state in which the drive shaft 7 has rotated further from the state shown in FIG. 7B. In the state shown in FIG. 7C, the rotation of the drive shaft 7 is completed, and the vertical center line 20 of the quadrangular hole 17 and the vertical center line 22 of the drive shaft 7 overlap with each other. In this state, the rotation of the drive shaft 7 is completed, so that the fitting shaft 9 (FIG. 6) starts to fit with the quadrangular hole 17, and thereafter the outer peripheral faces of the fitting shaft 9 move along the inner peripheral faces of the quadrangular hole 17 until fitting between the fitting shaft 9 and the quadrangular hole 17 is completed.

Figure 8A:
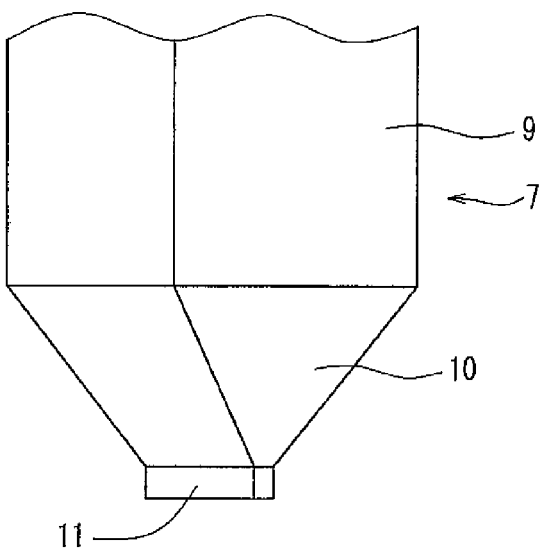
FIGS. 8A and 8B are diagrams for illustrating comparative examples, where
Figure 8A:
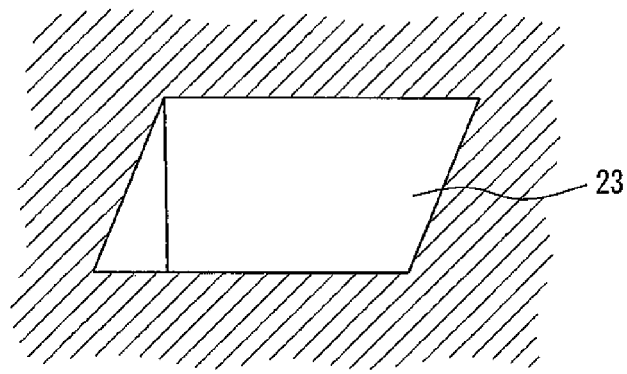

FIG. 8A is a perspective view showing a configuration in which the reel hole 6 of FIG. 6 is replaced with a reel hole 23 according to a comparative example. The reel hole 23 shown in FIG. 8A is a reel hole obtained by eliminating the chamfered portion 15 from the reel hole 6 shown in FIG. 6. The drive shaft 7 has the same configuration as the drive shaft 7 shown in FIG. 6. When the drive shaft 7 is moved toward the reel hole 23, the protrusion 11 and the guide shaft 10 enter the inside of the reel hole 23 in that order. When the drive shaft 7 is further moved, the guide shaft 10 comes into contact with an upper end portion of a quadrangular hole forming the reel hole 23.

Figure 9A:
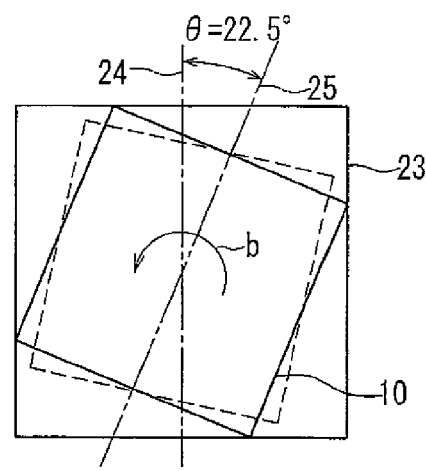
FIGS. 9A to 9C are diagrams for comparing states at the start of fitting of the guide shaft 10 into the reel hole 23 in the comparative example shown in FIG. 8A, where
Figure 9B:
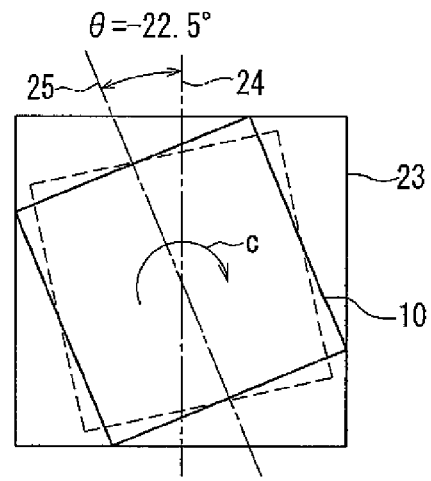
Figure 9C:
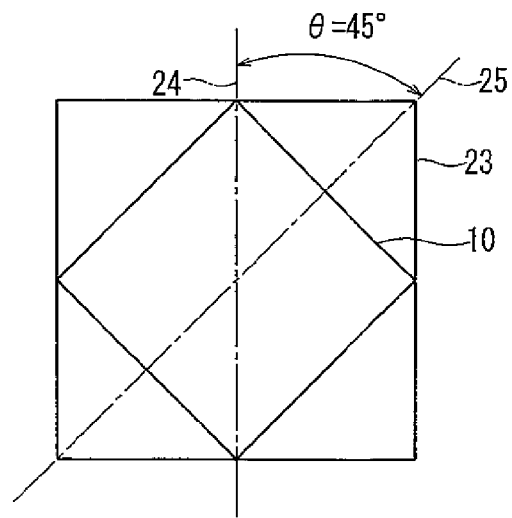

FIGS. 9A to 9C are plan views showing states of the configuration shown in FIG. 8A at the start of contact between the guide shaft 10 and the reel hole 23. Since the drive shaft 7 is rotatable, the rotation angle of the drive shaft 7 at the start of contact between the guide shaft 10 and the reel hole 23 is an arbitrary angle. Moreover, the outer dimensions of the guide shaft 10 increase toward the fitting shaft 9 side. For this reason, the size of the cross-sectional shape of the guide shaft 10 at the position of contact between the guide shaft 10 and the reel hole 23 varies with the rotation angle of the drive shaft 7 at the start of contact.

Regarding the guide shaft 10, FIGS. 9A to 9C show cross-sectional shapes of the guide shaft 10 at the positions of contact at the time when the guide shaft 10 initially comes into contact with the reel hole 23, rather than plan views of a part of the guide shaft 10 where the outer dimensions are maximal.

In FIGS. 9A to 9C, a vertical center line passing through the center and the midpoints of edges of a quadrangle defining the reel hole 23 is denoted by numeral 24, and a vertical center line passing through the center and the midpoints of edges of a quadrangle defining each of the cross-sectional shapes of the guide shaft 10 is denoted by numeral 25. Moreover, the vertical center line 24 of the reel hole 23 and the vertical center line 25 of the cross-sectional shapes of the guide shaft 10 form an angle θ.

FIG. 9A shows an example in which the angle θ is 22.5°. In this state, the guide shaft 10 can be rotated in the direction of the arrow b as indicated by a dashed line. FIG. 9B shows an example in which the angle θ is −22.5°. In this state, the guide shaft 10 can be rotated in the direction of the arrow c as indicated by a dashed line.

FIG. 9C shows an example in which the angle θ is 45°. In this state, the diagonal dimension of the cross-sectional shape of the guide shaft 10 matches the length of each of the edges of the reel hole 23. That is to say, the guide shaft 10 is in contact with the reel hole 23 in a stable state. Thus, when the guide shaft 10 is to be moved downward, it is difficult for the guide shaft 10 to rotate in both the left and right directions (the directions of the arrows b and c).

Therefore, with the configuration of the comparative example shown in FIG. 8A, when the angle θ is 45° as shown in FIG. 9C, it is difficult for the guide shaft 10 to move, and thus it is also difficult for the guide shaft 10 and the reel hole 23 to fit together.

Figure 10A:
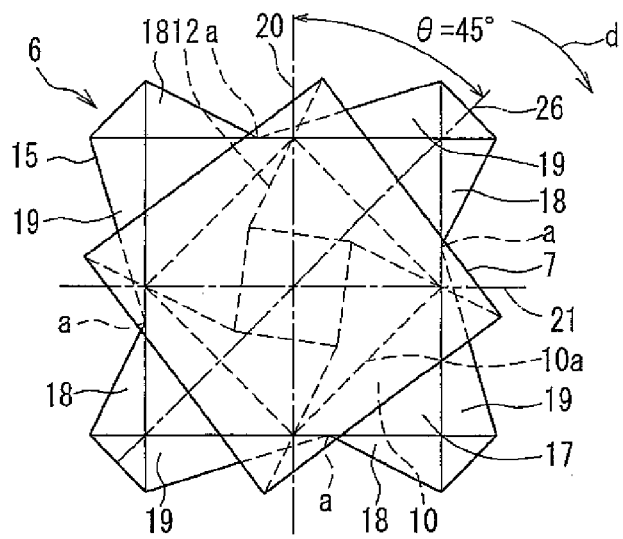
FIGS. 10A to 10C are plan views showing states from the start to the completion of fitting between the drive shaft and the reel hole according to the embodiment of the present invention, where

In the present embodiment, it is ensured that fitting of the drive shaft 7 is made easy irrespective of the angle θ. This will be described with reference to FIGS. 10A to 10C. FIG. 10A corresponds to a state in which the angle θ1 in FIG. 7A is increased. In FIG. 10A, a cross-sectional shape 10a of the guide shaft 10 is shown by a dashed line. The cross-sectional shape 10a is a cross-sectional shape at the position of contact at the time when the guide shaft 10 initially comes into contact with the chamfered portion 15 of the reel hole 6. A line 26 is a vertical center line passing through the center and the midpoints of edges of a quadrangle defining the cross-sectional shape 10a.

In the state shown in FIG. 10A, the angle θ formed by the vertical center line 20 of the reel hole 6 and the vertical center line 26 of the cross-sectional shape 10a is 45°. Furthermore, all of the ridgelines 12 of the guide shaft 10 are on the midpoints of respective edges of the quadrangular hole 17. This state corresponds to the state shown in FIG. 9C of the comparative example shown in FIG. 8A.

Here, a comparison between the state shown in FIG. 7A and the state shown in FIG. 10A indicates that all of the four ridgelines 12 in FIG. 7A are on the inclined faces 18 and all of the four ridgelines 12 in FIG. 10A are on the inclined faces 19. Thus, the states shown in FIGS. 7A and 10A are the same in that all of the four ridgelines 12 are on the inclined faces of the chamfered portion 15.

Therefore, also in the state shown in FIG. 10A, a similar motion occurs when the drive shaft 7 is to be moved further downward, with the exception of the rotating direction of the drive shaft 7. That is to say, in the state shown in FIG. 10A, when the drive shaft 7 is to be moved further downward, the ridgelines 12 are attracted to the wider side, namely, the deeper side of the inclined faces 19, and thus the drive shaft 7 rotates in the direction of the arrow d.

Figure 10B:
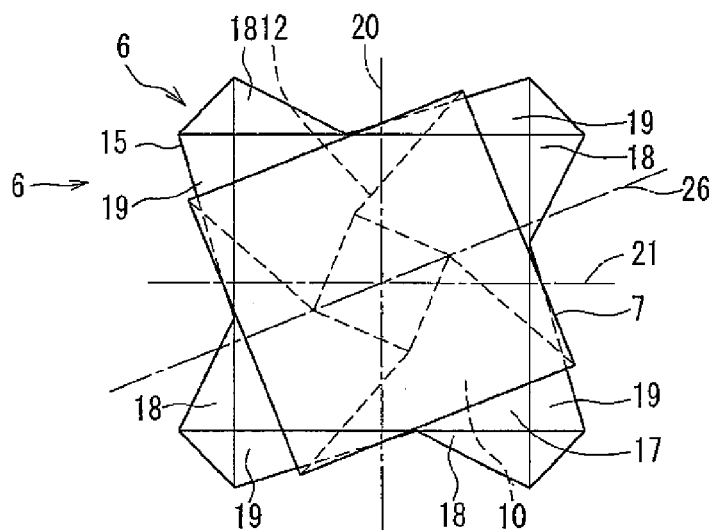

FIG. 10B shows a state after the drive shaft 7 has rotated further from the state shown in FIG. 10A. It can be seen from a comparison between the state shown in FIG. 10B and the state shown in FIG. 10A that the ridgelines 12 of the guide shaft 10 have been attracted to the wider side, namely, the deeper side of the inclined faces 18.

Figure 10C:
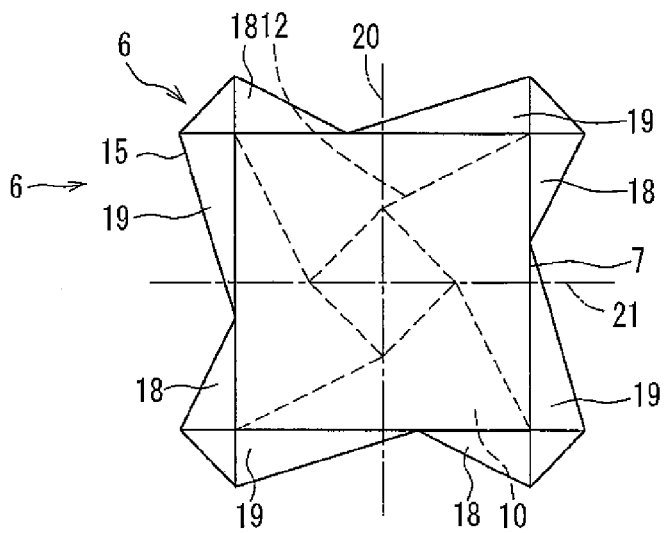

FIG. 10C shows a state in which the drive shaft 7 has rotated further from the state shown in FIG. 10B and the rotation is completed. This state is the same as that shown in FIG. 7C.

A comparison between the rotation of the drive shaft 7 shown in FIGS. 7A to 7C and the rotation of the drive shaft 7 shown in FIGS. 10A to 10C indicates that the drive shaft 7 rotates in the same manner, except that the rotating direction is different, while the ridgelines 12 move on the inclined faces 18 or 19. That is to say, even when the angle θ is 45° as shown in FIG. 10A in the state at the time when the guide shaft 10 starts to come into contact with the reel hole 6, fitting between the fitting shaft 9 and the quadrangular hole 17 proceeds smoothly.

Here, at the start of contact between the guide shaft 10 and the chamfered portion 15, a state in which all of the ridgelines 12 are on the four points a shown in FIG. 10A rather than on the inclined faces 18 or 19 of the chamfered portion 15 may occur. However, the points a are displaced from the midpoints of the edges of the quadrangular hole 17. Thus, the state in which the ridgelines 12 are on the four points a corresponds to a state in which the angle θ is negative as shown in FIG. 9B according to the comparative example rather than to the state in which the angle θ is 45° as shown in FIG. 10A.

In this state, the guide shaft 10 is not stably in contact with the reel hole 6 as described above, so that the drive shaft 7 rotates easily. In this case, regardless of the rotating direction, the drive shaft 7 moves such that the ridgelines 12 are placed on the inclined faces 18 or 19. During and after this movement, the drive shaft 7 rotates while being attracted along the slope of the inclined faces 18 or 19.

As described above, according to the present embodiment, fitting between the fitting shaft 9 and the quadrangular hole 17 can be carried out even more smoothly, irrespective of the rotation angle of the guide shaft 10 at the time when the guide shaft 10 comes into contact with the reel hole 6.

Figure 8B:
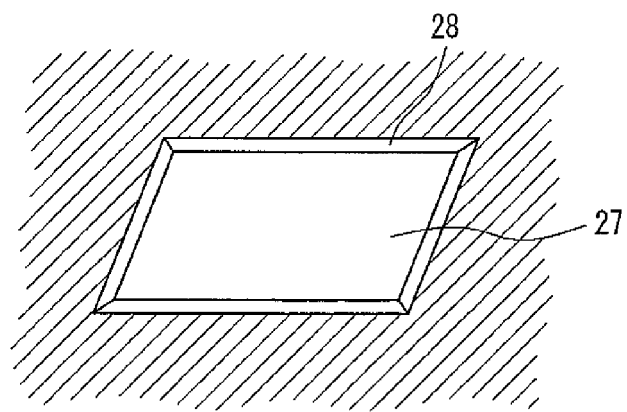

Hereinafter, evaluation results of the present embodiment will be described. Evaluations were made with respect to Example 1, in which the reel hole 6 as shown in FIGS. 5A and 5B was formed, using the maximum load during fitting of the fitting shaft 9 into the reel hole 6 after the state shown in FIG. 6. At the same time, the same evaluations were made with respect to Comparative Examples 1 and 2. A reel hole in Comparative Example 1 is a quadrangular hole wherein the outer periphery of which is not chamfered as is the case with the reel hole 23 shown in FIG. 8A. A reel hole in Comparative Example 2 is a quadrangular hole having a chamfered portion 28 of uniform chamfer width added to the outer periphery as is the case with a reel hole 27 shown in FIG. 8B. The chambered portion 28 had an angle of inclination of 45° and a chamfer width (width as seen from the side facing the reel hole) of 0.5 mm.

The evaluations were made when the drive shaft insertion angle was 22.5° and when it was 45°. The drive shaft insertion angle is the same as the angle θ, which was described using FIGS. 9A and 10A. Table 1 below shows the evaluation results.

TABLE 1

|  | Form of chamfer | Drive shaft insertion angle (θ) | |
| --- | --- | --- | --- |
|  |  | 22.5° | 45.0° |
| Comparative Example 1 | Without chamfer | 0.08-0.26 N | Not fittable (40 N or more) |
| Comparative Example 2 | Chamfer of uniform width | 0.05-0.20 N | Not fittable (40 N or more) |
| Example 1 | Chamfer of nonuniform width | 0.01 N | 0.01-0.02 N |

As can be seen from the results shown in Table 1, the results of Example 1 for both of the drive shaft insertion angles were more favorable than those of Comparative Examples 1 and 2. It can be considered that this is due to a drive shaft-attracting effect of the chamfered portion of the reel hole in Example 1.

Regarding Comparative Examples 1 and 2, when the drive shaft insertion angle was 45°, measuring equipment used in the evaluations could not apply a load sufficient to obtain a fit. This fact substantiates the description that it is difficult to obtain a fit when the angle θ is 45° as set forth using FIG. 9C.

In the foregoing embodiment, as shown in FIGS. 10A to C, the example in which the points a at which the widths of the inclined faces 18 and 19 are minimal are displaced from the center lines 20 and 21 of the quadrangular hole 17 was described. As another embodiment, a configuration in which the points a are on the center lines 20 and 21 is also conceivable. With this configuration, in the example shown in FIG. 10A, all of the ridgelines 12 of the guide shaft 10 are on the points a rather than on the slopes of the inclined faces 18 or 19.

However, when the guide shaft 10 slightly rotates, whether in a clockwise direction or in a counterclockwise direction, the ridgelines 12 of the guide shaft 10 move onto the slopes of the inclined faces 18 or 19. Therefore, it can be considered that even with the configuration in which the points a are on the center lines 20 and 21, the effect of making fitting between the fitting shaft 9 and the quadrangular hole 17 more smooth irrespective of the rotation angle of the guide shaft 10 at the start of the fitting can be achieved.

Furthermore, in the foregoing embodiment, the guide shaft 10 of the drive shaft 7 was described using the shape obtained by twisting the entire guide shaft 10 in one direction central to the axis of the drive shaft 7 as an example. However, the guide shaft 10 of the drive shaft 7 may have a truncated quadrangular pyramid shape without a twist.

Furthermore, although the example in which the protrusion 11 is formed at an end portion of the drive shaft 7 was described, the protrusion 11 neither comes into contact with the chamfered portion 15 of the reel hole 6 nor fits with the reel hole 6. Thus, the shape of the protrusion 11 is not intended to be limited to the shape shown in FIG. 4A and FIG. 4B and can be decided as appropriate. A configuration in which the protrusion 11 is not provided is also possible.

Furthermore, the example in which a portion of the reel hole 6 that fits with the guide shaft 10 of the drive shaft 7 is the quadrangular hole 17 was described. However, this portion may be another polygonal hole such as a triangular hole or a pentagonal hole. In this case, also the fitting shaft 9 and the guide shaft 10 of the drive shaft 7 have shapes adapted to the polygonal hole of the reel hole 6.

Moreover, the shape of the polygonal hole defining the reel hole can be a shape that that can fit with the fitting shaft and that transmits the torque during the rotation of the fitting shaft. Accordingly, the polygonal hole does not necessarily define a perfect polygon, and, for example, intersections of inner peripheral faces of the polygonal hole may be in the form of curved surfaces.

Furthermore, in the example of the foregoing description, the inclined faces 18 and 19 of the chamfered portion 15 were flat surfaces. However, the inclined faces 18 and 19 may be curved surfaces or surfaces including curved surfaces.

Furthermore, in the foregoing description, the single-reel type tape cartridge 1 was used as an example of the tape cartridge. However, the present invention may be used in a multi-reel type tape cartridge.

Furthermore, as described above, the feature of the present invention is the configuration of the reel hole 6. Thus, the reel structure other than the reel hole 6 is not intended to be limited to the configuration shown in FIG. 2, and another configuration is also possible.

According to the present invention, it is possible to provide an improved fit between the reel hole and the drive shaft of the drive. Thus, the present invention is useful for, for example, computer tape cartridges.

The invention may be embodied in other forms without departing from the spirit or essential characteristics thereof. The embodiment disclosed in this application is to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A tape cartridge comprising a reel wound with a tape, wherein a reel hole that fits with a drive shaft provided in a drive for rotationally driving the reel is formed in a surface of the reel,
the drive shaft comprises a fitting shaft that fits with the reel hole and a guide shaft that enters the reel hole before the fitting shaft and has an outer dimension increasing toward the fitting shaft,
a chamfered portion is formed so as to surround the outer periphery of the reel hole,
the chamfered portion is constituted by an inclined face joining an inner peripheral face of the reel hole to the surface in which the reel hole is formed, and
when the reel hole is viewed from a side facing an opening portion of the reel hole, a portion of the reel hole that fits with the fitting shaft has a polygonal shape, and the inclined face contains a portion in which the width of the inclined face varies along an edge of the polygonal shape.

2. The tape cartridge according to claim 1, wherein in the portion in which the width of the inclined face varies, the width of the inclined face increases toward a corner of the polygonal shape.

3. The tape cartridge according to claim 1, wherein when the reel hole is viewed from the side facing the opening portion of the reel hole, a position at which the width of the inclined face is minimal is displaced from a position on a line passing through the center of the polygonal shape and the midpoint of the edge of the polygonal shape.

* * * * *